United States Patent [19]

Zettier

[11] Patent Number: 4,929,227
[45] Date of Patent: May 29, 1990

[54] CENTRIFUGE DRUM FOR SEPARATING MIXTURES OF LIQUIDS

[75] Inventor: Karl-Heinz Zettier, Oelde, Fed. Rep. of Germany

[73] Assignee: Westfalia Separator AG, Oelde, Fed. Rep. of Germany

[21] Appl. No.: 249,048

[22] Filed: Sep. 23, 1988

[30] Foreign Application Priority Data

Oct. 16, 1987 [DE] Fed. Rep. of Germany ....... 3735031

[51] Int. Cl.$^5$ ............ B04B 1/04; B04B 7/04; B04B 11/08
[52] U.S. Cl. .................................. 494/41; 494/56; 494/63
[58] Field of Search .................. 494/56, 57, 60, 63, 494/67, 68, 70, 71, 72, 73, 43, 44, 69, 85, 1, 2, 5, 6, 3, 58, 59, 40, 41; 210/360.1, 360.2, 369, 371, 372, 373, 377, 380.1, 402, 403, 374, 781

[56] References Cited

U.S. PATENT DOCUMENTS

| | | | |
|---|---|---|---|
| 872,173 | 11/1907 | Forsberg | 494/57 |
| 1,212,370 | 1/1917 | Leitch | 494/63 X |
| 1,595,017 | 8/1926 | Meyer et al. | 494/70 X |
| 2,139,715 | 12/1938 | Bergner | 494/43 |
| 2,344,888 | 3/1944 | Lindgren | 494/57 |
| 2,403,089 | 7/1946 | Lars | 494/68 X |
| 2,547,612 | 4/1951 | Andersson | 494/57 X |
| 2,578,485 | 12/1951 | Nyrop | 494/56 X |
| 3,167,509 | 1/1965 | Steinacker | 494/3 |
| 3,217,982 | 11/1965 | Wilsmann et al. | 494/57 X |
| 3,468,475 | 9/1969 | Thylefors | 494/56 X |
| 3,990,632 | 11/1976 | Hemfort | 494/2 |
| 4,151,950 | 5/1979 | Gunnewig | 494/2 |
| 4,695,270 | 9/1987 | Zettier | 494/56 X |

FOREIGN PATENT DOCUMENTS

| | | | |
|---|---|---|---|
| 343508 | 4/1937 | Italy | 494/60 |
| 495720 | 6/1954 | Italy | 494/60 |

*Primary Examiner*—Harvey C. Hornsby
*Assistant Examiner*—Scott J. Haughland
*Attorney, Agent, or Firm*—Sprung Horn Kramer & Woods

[57] ABSTRACT

A centrifuge drum for separating mixtures of liquids, especially for separating refrigerated milk into cream and skim milk, with an intake pipe secured to a stationary housing to supply refrigerated milk to a separation space in the centrifuge drum and a pealing disk for diverting the separated skim milk. The pealing disk is positioned in a pealing chamber that communicates through channels with the periphery of the separation space. A diversion chamber is disposed between the separation space and the pealing chamber that communicates with the center of the separation space and has a diversion channel for diverting the cream into a stationary interception chamber. The pealing chamber is positioned axially between the diversion chamber and the interception chamber and the diversion channel is positioned concentric with the axis of rotation of the drum, whereby the diversion channel extends radially outward from the diversion chamber, through the center of the pealing disk, and into the interception chamber.

7 Claims, 2 Drawing Sheets

CENTRIFUGE DRUM FOR SEPARATING MIXTURES OF LIQUIDS

BACKGROUND OF THE INVENTION

The invention concerns a centrifuge drum for separating mixtures of liquids, especially for separating refrigerated milk into cream and skim milk, with an intake pipe secured to a stationary housing to supply refrigerated milk to a separation space in the centrifuge drum and a pealing disk for diverting the separated skim milk, whereby the peeling disk is positioned in a peeling chamber that communicates through channels with the periphery of the separation space, and with a diversion chamber between the separation space and the peeling chamber that communicates with the center of the separation space and has a diversion channel for diverting the cream into a stationary interception chamber.

A centrifuge drum of this type is known, from Italian Pat. No. 630 562 for example. The diversion channels in the known centrifuge drum are intended to divert the cream radially out of the drum from the diversion chamber to its outer circumference, where they open into interception chambers that are distributed concentrically around its circumference. Since centrifuge drums usually operate at very high speeds, the cream is diverted into the interception chambers at a very high outflow rate proportionate to the peripheral velocity prevailing at the circumference of the diversion chamber. The resulting mechanical stress is detrimental to the cream, which can butter off.

OBJECT OF THE INVENTION

The object of the invention is to improve the generic centrifuge drum to the extent that the separated cream will be diverted gently out of the drum.

SUMMARY OF THE INVENTION

This object is attained by the improvement wherein the peeling chamber is positioned axially between the diversion chamber and the interception chamber and the diversion channel is positioned concentric with the axis of rotation of the drum, whereby the diversion channel extends radially inwardly of the diversion chamber, through the center of the peeling disk, and into the interception chamber.

The position of the diversion channel allows the cream to exit from the centrifuge drum at an extremely short diameter. Short diameters signify simultaneously low peripheral velocities and hence low mechanical stress on the exiting cream. The outside diameter of the interception chamber can also be kept very short because it also depends on the diameter where the cream exists the drum.

The interception chamber in one advantageous embodiment of the invention is outside of the housing and hermetically sealed off from the inside of it. The hermetic seal is created by the peeling disk immersing itself into the liquid when the drum is in operation. That the cream is accordingly also not stressed by the powerful circulation of air and the pressure differences usually present in the housing is another contribution to the gentle handling of the cream. Furthermore, there will no longer be any problems in sealing the interception chamber off from the other areas of the housing.

An overflow chamber can be positioned between the diversion chamber and an intake chamber and can accommodate a peeling device that is secured to the intake pipe and communicates with the atmosphere through a channel.

Means of generating impedance can be positioned in the conveying channels.

An overflow sluice can be positioned at the center of the interception chamber and can communicate with an overflow chamber that has a control outlet.

An adjustable choking device can be associated with the exit from the diversion channel.

A rotating seal can be positioned between the diversion channel and the interception chamber.

BRIEF DESCRIPTION OF THE DRAWINGS

The invention will now be specified with reference to the drawings, wherein.

DETAILED DESCRIPTION OF THE INVENTION

Figure 1:
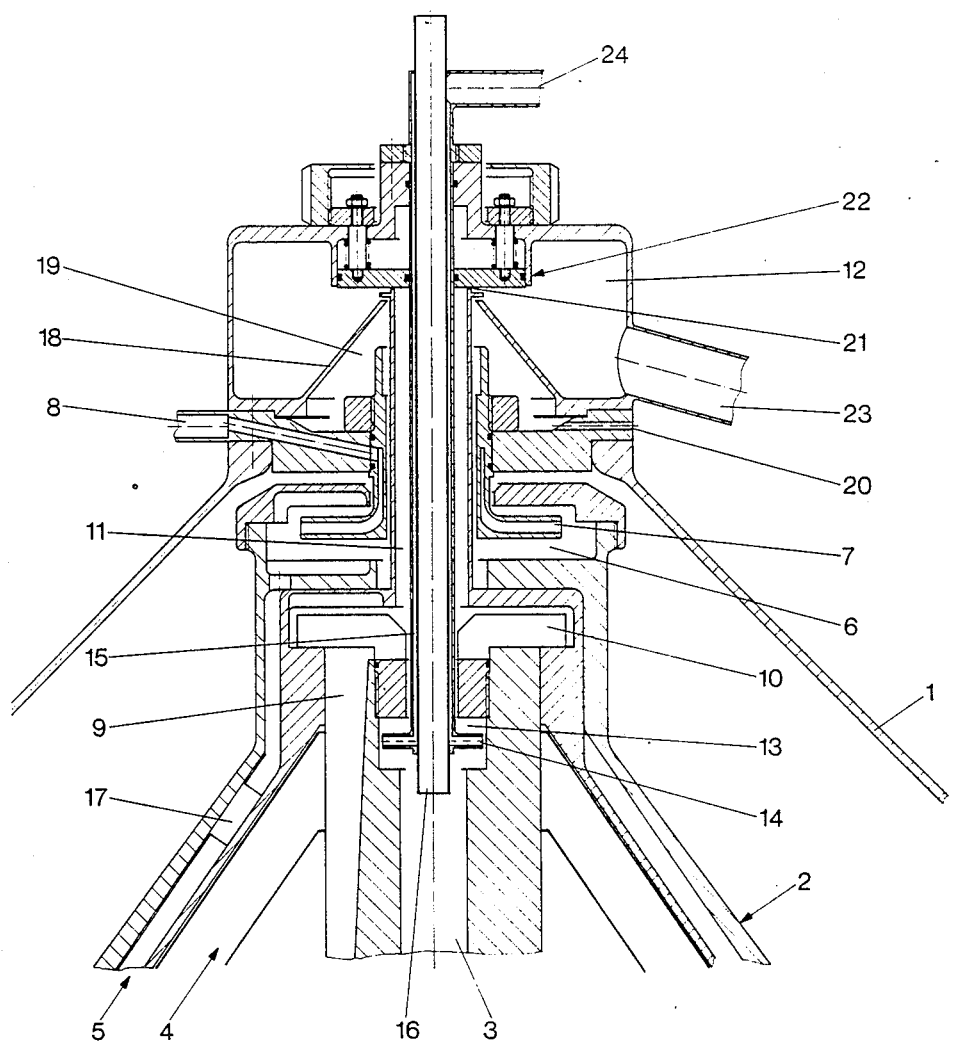
FIG. 1 is a section through part of a centrifuge drum.

With reference now to FIG. 1, a centrifuge drum 2 that rotates in a stationary housing accommodates an intake chamber 3 and a separation space 4, from which conveying channels 5 extend into a peeling chamber 6. Peeling chamber 6 accommodates a peeling disk 7 that diverts skim milk out of the drum by way of an outlet 8. Channels 9 extend from the center of separation space 4 into a diversion chamber 10 below peeling chamber 6. A diversion channel 11 extends from diversion chamber 10, through the center of peeling disk 7, and into an interception chamber 12 above peeling chamber 6. Between diversion chamber 10 and intake chamber 3 is an overflow chamber 13 that accommodates a peeling device 14. Peeling device 14 is secured to the bottom of an intake pipe 16, which opens into intake chamber 3, and communicates with an outlet 24 by way of a channel 15. Conveying channels 5 accommodate means 17 of generating impedance. Accommodated at the center of interception chamber 12 is an overflow sluice 18 that communicates with an overflow chamber 19. A control outlet 20 extends into the atmosphere from overflow chamber 19. At the exit 21 from diversion channel 11 is a choking device 22 that can be adjusted from outside. Associated with interception chamber 12 is an outlet 23.

The refrigerated milk arrives in the separation space 4 in drum 2 by way of intake pipe 16 and intake chamber 3. The separated skim milk is extracted from the periphery of the separation space by way of conveying channels 5 and arrives in peeling chamber 6, whence it is diverted by way of peeling disk 7 and outlet 8. The cream flows out of the center of separation space 4 into diversion chamber 10 by way of channels 9 and arrives in interception chamber 12 by way of diversion channel 11. It leaves interception chamber 12 by way of outlet 23. In order to arrive at the centrally located diversion channel 11, the cream must be forced in radially. This motion can be ensured by increasing the opposing pressure in outlet 8 by means of an unillustrated valve until peeling disk 7 immerses as far as possible into the milk. Since the specific weight of the cream is lower than that of the milk, the level of the liquid in diversion chamber 10 will shift radially inward farther than the level of the liquid in peeling chamber 6. An additional shift on the part of the communicating levels of the liquids in peeling chamber 6 and in diversion chamber 10 is achieved by the means 17 of generating impedance in conveying channels 5. These means can be choking devices that constrict the cross-section of the channels for example. It is, however, also possible to discontinue the radial flow of the liquid by annular interruptions in conveying channels 5. This measure will, as is known, increase the impedance because the liquid will not, as it travels radially inward, decrease its peripheral velocity any further in annular spaces that do not have ribs, and will accordingly generate a higher opposing pressure.

Since the cream is to be forced, due to the desirable gentle conveyance, as far toward the center as possible, it is also possible for an undesirable interchange of liquids to occur between intake chamber 3 and diversion chamber 10. This would be detrimental to the cream in particular in the event of a flow from the intake chamber into the diversion chamber. This situation is prevented by an overflow chamber 13 between intake chamber 3 and diversion chamber 10 from which liquid arriving in overflow chamber 13 from one of the two chambers 3 and 10 can be diverted by peeling device 14 into channel 15 and outlet 24. The volume of outgoing liquid can be controlled by an unillustrated valve in outlet 24. Interception chamber 12 is flanged onto housing 1 and hermetically sealed off from the inside of the housing by the immersion of peeling disk 7 into the milk. Once the interception chamber is filled up to the level of overflow sluice 18, some of the outgoing cream will flow into overflow chamber 19 and thence into the atmosphere by way of control outlet 20. This measure makes it easy to determine whether the cream is being diverted unobjectionably. The choking device 22 that can be adjusted from outside can be employed to vary the outlet pressure in diversion channel 11, another means of adjusting the liquid phases in the drum.

Figure 2:
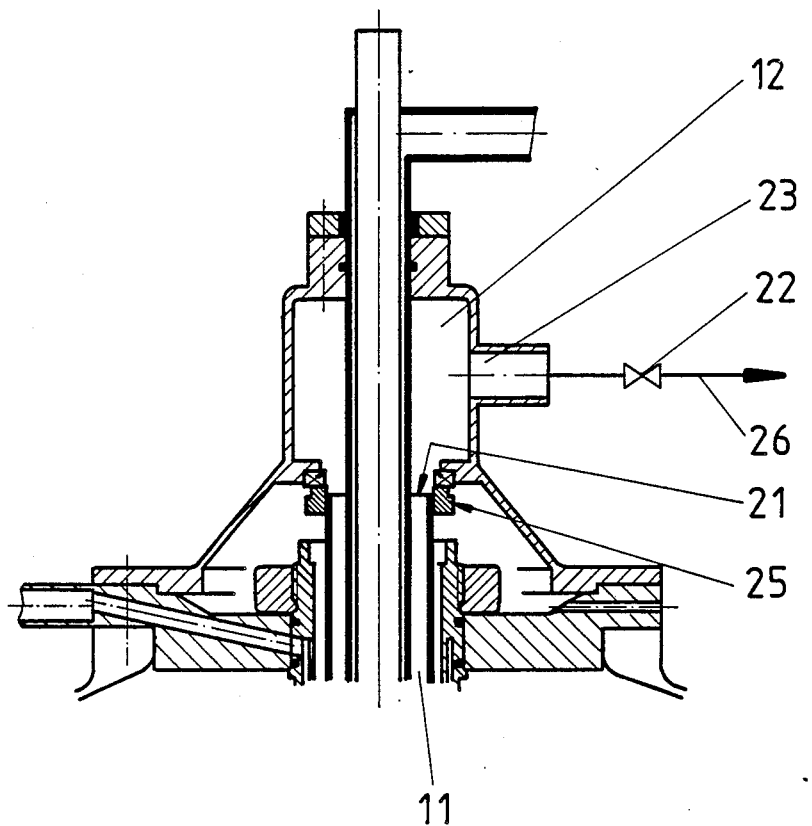
FIG. 2 illustrates a rotating seal between the exit from the diversion channel and the interception chamber.

The embodiment illustrated in FIG. 2 has a rotating seal 25 between the exit 21 from diversion channel 11 and interception chamber 12. Since the pressure in diversion channel 11 can accordingly be transferred to outlet 23, no special means of conveying the cream are necessary. The choking device 22 in this embodiment is accommodated in a line 26 that communicates with outlet 23.

What is claimed is:

1. In a centrifuge drum rotatable around an axis for separating refrigerated milk into cream and skim milk, comprising a stationary housing, an intake pipe secured to the stationary housing to supply refrigerated milk to a separation space in the centrifuge drum and a peeling disk for diverting the separated skim milk, a peeling chamber in which the peeling disk is positioned and that communicates through conveying channels with a peripheral portion of the separation space, a stationary interception chamber, and a diversion chamber between the separation space and the peeling chamber that communicates with a central portion of the separation space and has a diversion channel for diverting cream into the stationary interception chamber, the improvement wherein the peeling chamber is positioned axially between the diversion chamber and the interception chamber and the diversion channel is positioned concentric with the axis of rotation of the drum and rotatable therewith and wherein the diversion channel extends radially inwardly of the diversion chamber, through the center of the peeling disk and into the interception chamber and further comprising an intake chamber having an intake pipe and an overflow chamber positioned between the diversion chamber and the intake chamber, a peeling device in the overflow chamber and secured to the intake pipe and a channel communicating the peeling device with the atmosphere, the peeling device being arranged for directing liquid from the overflow chamber through the channel.

2. A centrifuge drum according to claim 1, wherein the interception chamber is outside of the housing and hermetically sealed off from the inside of it.

3. A centrifuge drum according to claim 1, further comprising means for generating impedance positioned in the conveying channels.

4. A centrifuge drum according to claim 1, further comprising an overflow sluice positioned at the center of the interception chamber and in communication with a second overflow chamber.

5. A centrifuge drum according to claim 1, wherein the diversion channel has an exit and further comprising adjustable choking means associated with the exit from the diversion channel.

6. A centrifuge drum according to claim 1, further comprising a rotating seal positioned between the diversion channel and the interception chamber.

7. In a centrifuge drum rotatable about an axis for separating refrigerated milk into cream and skim milk, comprising a stationary housing, an intake pipe secured to the stationary housing to supply refrigerated milk to a separation space int he centrifuge drum and a peeling disk for diverting the separated skim milk, a peeling chamber in which the peeling disk is positioned and that communicates through conveying channels with a peripheral portion of the separation space, a stationary interception chamber, and a diversion chamber between the separation space and the peeling chamber that communicates with a central portion of the separation space and has a diversion channel for diverting cream into the stationary interception chamber, the improvement wherein the peeling chamber is positioned axially between the diversion chamber and the interception chamber and the diversion channel is positioned concentric with the axis of rotation of the drum and wherein the diversion channel extends radially inwardly of the diversion chamber, through the center of the peeling disk and into the interception chamber and further comprising a rotating seal positioned between the diversion channel and the interception chamber.

* * * * *